United States Patent [19]

Yamashita

[11] 4,172,215

[45] Oct. 23, 1979

[54] TRANSFORMER COUPLING CIRCUIT PROVIDING FOR CANCELLATION OF D.C. FLUXES

[75] Inventor: Hidetaka Yamashita, Kamakura, Japan

[73] Assignee: Hitachi, Ltd., Japan

[21] Appl. No.: 836,591

[22] Filed: Sep. 26, 1977

[30] Foreign Application Priority Data

Sep. 27, 1976 [JP] Japan .................................. 51-114758

[51] Int. Cl.² ............................................. H04M 3/18
[52] U.S. Cl. ................................. 179/174; 179/16 A; 179/18 AH
[58] Field of Search ............. 179/78 R, 78 A, 18 AH, 179/16 A, 16 AA, 18 FA, 18 F, 174

[56] References Cited

U.S. PATENT DOCUMENTS

| | | | |
|---|---|---|---|
| 2,282,129 | 5/1942 | Hadfield | 179/16 AA |
| 3,055,986 | 9/1962 | Hjertstrand | 179/16 A |
| 3,849,607 | 11/1974 | Carbrey | 179/18 AH X |

FOREIGN PATENT DOCUMENTS 455189 10/1936 United Kingdom .................. 179/78 R

*Primary Examiner*—Thomas W. Brown
*Attorney, Agent, or Firm*—Craig and Antonelli

[57] ABSTRACT

In a coupling circuit for A.C. coupling a switching network to a trunk circuit through a coupling transformer, a magnetic flux cancel circuit is provided for canceling non-varying magnetic fluxes produced by direct current components of a switch-hold current and a control signal which are applied, respectively, to the primary and the secondary windings of the transformer at its core to each other. The flux cancel circuit comprises a rectifier circuit such as a diode bridge circuit. The rectifier circuit is connected at least between the trunk circuit and the secondary winding of the transformer coupled therewith such that the direction of an output current of the rectifier is predetermined with respect to that of a direct current supplied to the primary winding to cancel the non-varying magnetic fluxes by the direct currents in the transformer.

11 Claims, 3 Drawing Figures

FIG. I
PRIOR ART
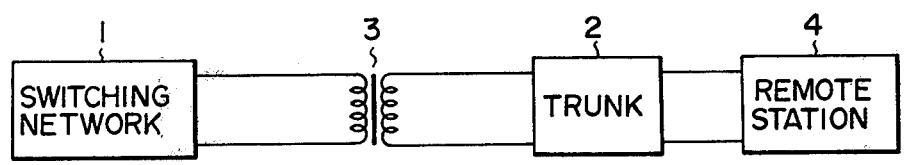
FIG. 2
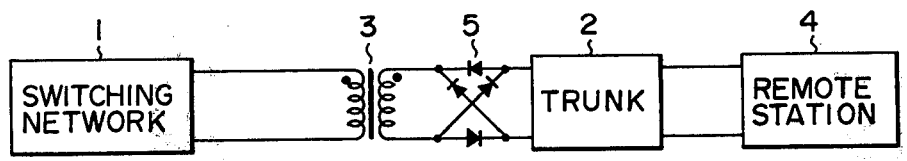
FIG. 3
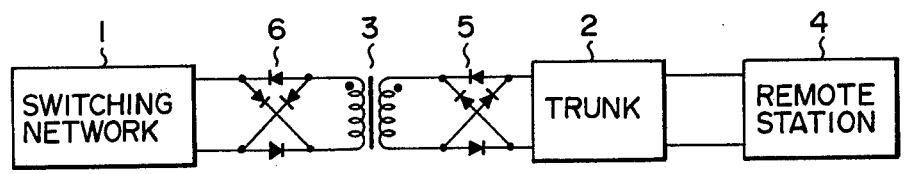

TRANSFORMER COUPLING CIRCUIT PROVIDING FOR CANCELLATION OF D.C. FLUXES

BACKGROUND OF THE INVENTION

The present invention relates to an improvement in a coupling circuit for A.C. coupling a switching network in a telephone exchange apparatus to a trunk circuit through a transformer.

FIG. 1 shows a prior art coupling circuit for coupling a switching network in a telephone exchange apparatus to a trunk circuit. In FIG. 1, numeral 1 denotes the switching network, 2 the trunk circuit, 3 a transformer and 4 a remote station.

In the prior art coupling circuit, when the switching network 1 is coupled to the trunk circuit 2 through the transformer 3, it has been a common practice to supply a direct current for holding selected switches in the switching network 1 and to supply a direct current between the other winding, i.e., the secondary winding, of the transformer 3 on the side of the trunk circuit 2 and the remote station 4 so that a voice signal is communicated between the remote station 4 and the trunk circuit 2 in accordance with the polarity (or direction) of the latter current. Thus, the current in the winding of the secondary transformer 3 on the side of the trunk circuit 2 flows in one direction or the other depending on the signal condition and has no constant direction. Accordingly, the transformer 3 must be designed to take into consideration the possibility that a condition might occur wherein direct currents flow in the respective windings of the transformer 3 in the same direction such that nonvarying magnetic fluxes produced by the D.C. component of the transformer current on the side of the switching network 1 and that on the side of the trunk circuit 2 are additive in the core of the transformer in which a magnetic flux path is established. In such case, a large direct current is superimposed on the transformer, resulting in the need to increase the size of the transformer to avoid saturation thereof, which will produce deterioration of the A.C. transmission characteristic through the transformer.

SUMMARY OF THE INVENTION

It is an object of the present invention to provide an economic coupling circuit which has a good A.C. transmission characteristic between a switching network utilizing semiconductor switching elements and a trunk circuit.

The present invention is directed to a coupling circuit for coupling the switching network to the trunk circuit through a transformer having a rectifier circuit inserted in at least one of a primary winding and a secondary winding of the transformer such that magnetic fluxes created by direct currents flowing in the two windings of the transformer are maintained in an opposite direction to each other.

BRIEF DESCRIPTION OF THE DRAWINGS

FIG. 1 shows a prior art coupling circuit for coupling a switching network to a trunk circuit; and FIGS. 2 and 3 show embodiments of a coupling circuit of the present invention for coupling the switching network to the trunk circuit.

DETAILED DESCRIPTION OF THE PREFERRED EMBODIMENTS

FIG. 2 is a circuit diagram illustrating one embodiment of a coupling circuit for coupling a switching network to a trunk circuit in accordance with the present invention. In FIG. 2, numeral 5 denotes a diode bridge circuit and other parts are similar to those shown in FIG. 1.

Let assume that the direction of current flowing from the switching network 1 to the primary winding of the transformer 3 is constant. That is, it is assumed that the switching network 1 is comprised of directional semiconductor switching devices, for example a semiconductor diode array in the form of an integrated circuit. Under such a circumstance, the diode bridge circuit 5 need be coupled only across the secondary winding on the side of the trunk circuit 2 of the transformer 3. The diode bridge circuit 5 is connected to the transformer 3 such that a direct current developed from the diode bridge circuit 5 into the secondary winding of the transformer 3 flows in the direction to cancel the non-varying magnetic flux component produced by a direct current flowing from the switching network 1 into the primary winding of the transformer 3. With this arrangement, when a signal communication by polarity reversal is carried out between the trunk circuit 2 and the remote station 4, a current of constant direction will always flow into the secondary winding of the transformer 3 owing to the diode bridge circuit 5 and the direction of the current is selected to cancel the non-varying magnetic fluxes created in the transformer 3 due to the D.C. components flowing in the two windings. Accordingly, the A.C. transmission characteristic between the switching network 1 and the trunk circuit 2 can be improved.

FIG. 3 shows another embodiment of the present invention which is applicable to a circumstance where the direction of current from the switching network 1 to the primary winding of the transformer 3 is not constant. In FIG. 3, an additional diode bridge circuit 6 is inserted across the primary winding of the transformer 3 on the side of the switching network 1. The other parts are similar to those shown in FIG. 2. The diode bridge circuit 6 is connected in such a direction that magnetic fluxes created by the current flowing from the diode bridge circuit 5 into the secondary winding of the transformer 3 and the current flowing from the diode bridge 6 into the primary winding of the transformer 3 cancel each other.

With this arrangement, the currents will not flow in the two windings of the transformer 3 in the direction to add the magnetic fluxes, and the transformer 3 may be designed taking into the consideration a circumstance where, in the worst case, only one of the currents having a larger absolute value is flowing. Thus, the design requirement is considerably relieved in comparison with the prior art circuit where the sum of both currents must be taken into consideration. In general, for a given size of the transformer, a transformer having a better transmission characteristic can be used, and for a given transmission characteristic, a transformer of a smaller size can be used.

In a special circumstance, a good A.C. transmission characteristic is required only for a given time period, i.e., only during the speech period, and it is sufficient to assure that currents flow on both sides of the transformer 3 during that period. In such a case, it is apparent that the transformer may be designed merely taking into consideration a difference between the currents flowing in the windings on the both sides of the transformer. Accordingly, the design requirement is further relieved in comparison with the previous case where the current of larger absolute value is taken into consideration. In a further special case where the currents in the windings on both sides of the transformer are equal in absolute value but opposite in polarity, the direct current superposition need not be taken into consideration in designing the transformer.

What is claimed is:

1. A coupling circuit for A.C. coupling a switching network to a trunk circuit comprising a transformer having primary and secondary windings connected to said switching network and said trunk circuit, respectively, and a rectifier circuit connected across at least one of the primary winding and the secondary winding of said transformer with such a polarity that magnetic fluxes created by direct currents flowing in said primary winding from said switching network and said secondary winding from said trunk circuit will be always in opposite directions to each other.

2. A coupling circuit according to claim 1, wherein said rectifier circuit comprises a diode bridge circuit.

3. A coupling circuit according to claim 1, wherein said rectifier circuit is inserted across the secondary winding of said transformer on the side of said trunk circuit.

4. A coupling circuit according to claim 1, wherein said switching network is comprised of directional semi-conductor switching devices and said rectifier circuit is inserted only across the secondary winding of said transformer on the side of said trunk circuit in such a polarity that the magnetic fluxes created by the direct currents flowing in said windings of said transformer are in opposite direction to each other.

5. A coupling circuit for A.C. coupling a first circuit through a transformer to a second circuit from which a direct current of reversible polarity flows to said transformer, said first circuit also providing a direct current to said transformer comprising:

(a) a coupling transformer having a primary winding, a secondary winding for passing an A.C. signal and a magnetic core, the primary winding being connected to the switching network for generating a primary magnetic flux in said magnetic core in response to a primary direct current supplied to the primary winding from the switching network to hold selected switches of said switching network; and (b) a rectifier circuit having a pair of input terminals and a pair of output terminals for providing a constant polarity output at said output terminals independently of the polarity of a direct current supplied to said input terminals, said input terminals being connected to said polarity reversal trunk circuit and said output terminals being connected to the secondary winding of said transformer, said secondary winding generating a secondary magnetic flux in said magnetic core in response to the output developed at said output terminals of said rectifier circuit;

said rectifier circuit being connected to said transformer in a sense such that the polarity of the output developed at the output terminals of said rectifier circuit with respect to the polarity of the primary direct current will always be such that the secondary magnetic flux generated by the direct component of said output in the secondary winding is in an opposite direction to the primary magnetic flux generated in the primary winding, to thereby cancel the respective fluxes in the magnetic core of the transformer.

6. The coupling circuit according to claim 5, in which said rectifier circuit comprises a diode bridge circuit including at least four diodes in a bridge connection, common connections of the same poles of each pair of said diodes constituting the output terminals of the rectifier circuit, and common connections of mutually opposite poles of each pair of said diodes constituting the input terminals, said input terminals being connected to the trunk circuit and said output terminals being connected to the secondary winding of the transformer.

7. The coupling circuit according to claim 5, in which a second diode rectifier circuit is provided between said switching network and the primary winding of said coupling transformer for retaining the polarity of said primary direct current constant.

8. The coupling circuit according to claim 5, in which said second diode rectifier circuit comprises at least four diodes in a bridge connection, common connections of the same poles of each pair of said diodes being coupled to said primary winding of the transformer and common connections of mutually opposite poles of each pair of said diodes being coupled to said switching network.

9. An A.C. signal transferring system comprising:
first means for generating a first direct current of fixed polarity and A.C. signals superposed on said first direct current;
second means for generating a second direct current of fixed polarity;
a transformer having a primary winding and a secondary winding;
said primary winding being connected to said first means and generating a magnetic flux in response to said first direct current and said A.C. signals;
said secondary winding being connected to said second means and generating a magnetic flux in response to said second direct current, whereby said A.C. signals are transferred from said first means to said second means through said transformer;
said first and second windings being provided so that the directions of the magnetic fluxes generated by said first and second direct currents, respectively, are in opposite directions to each other in said transformer.

10. An A.C. signal transferring system according to claim 9, wherein one of said first and second means comprises a first device providing a reversible direct current and a second device connected to said first device and said transformer for providing to said transformer a direct current of fixed polarity in response to said reversible direct current, said second device comprising a rectifier circuit having a pair of input terminals and a pair of output terminals for providing current of predetermined polarity at said output terminals independently of the direction of a current supplied to said input terminals, said input terminals thereof being connected to said first device and said output terminals thereof being connected to said transformer.

11. A coupling circuit for coupling first and second devices to transfer A.C. signals superposed on direct currents therebetween, said direct currents provided by said first and second devices having an invariable polarity and an amplitude which are unrelated between the respective currents, said coupling circuit comprising a transformer having a primary winding and a secondary winding, said primary winding being connected to said first device and generating a magnetic flux in response to the current flowing in said first device, and said secondary winding being connected to said second device and generating a magnetic flux in response to the current flowing in said second device, both said primary and secondary windings being provided so that the magnetic fluxes generated by each of said direct currents in said primary and secondary windings are in opposite directions to each other in said transformer.

* * * * *